(12) United States Patent
Lin et al.

(10) Patent No.: US 10,491,760 B1
(45) Date of Patent: Nov. 26, 2019

(54) IMAGE TRANSMISSION DEVICE, IMAGE TRANSMISSION METHOD, AND IMAGE TRANSMISSION SYSTEM

(71) Applicant: DELTA ELECTRONICS, INC., Taoyuan (CN)

(72) Inventors: Botao Lin, San Diego, CA (US); Cho-Cheng Lin, Taoyuan (TW); Ya-Ting Huang, Taoyuan (TW); Wei-Chi Shih, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/216,537

(22) Filed: Dec. 11, 2018

Related U.S. Application Data

(60) Provisional application No. 62/694,208, filed on Jul. 5, 2018.

(30) Foreign Application Priority Data

Oct. 24, 2018 (CN) .......................... 2018 1 1241556

(51) Int. Cl.
*H04N 1/00* (2006.01)
*G06F 13/40* (2006.01)

(52) U.S. Cl.
CPC ......... *H04N 1/00209* (2013.01); *G06F 13/40* (2013.01); *H04N 1/0001* (2013.01)

(58) Field of Classification Search
CPC ... H04N 1/00209; H04N 1/0001; G06F 13/40

USPC ........................................................ 358/1.15
See application file for complete search history.

(56) References Cited

U.S. PATENT DOCUMENTS

| 8,024,503 B2 | 9/2011 | Zhang |
| 8,352,616 B2 | 1/2013 | Austin et al. |
| 9,106,950 B2 | 8/2015 | Howarter et al. |
| 2002/0196378 A1* | 12/2002 | Slobodin ............... G06F 3/1415 348/744 |

(Continued)

FOREIGN PATENT DOCUMENTS

| CN | 203385984 U | 1/2014 |
| CN | 106792494 A | 5/2017 |

(Continued)

*Primary Examiner* — Allen H Nguyen
(74) *Attorney, Agent, or Firm* — Kirton McConkie; Evan R. Witt

(57) ABSTRACT

An image transmission device includes a CPU, and a wireless communication module, a button, a USB connector and an internal storage unit connected with the CPU. The USB connector is inserted into a computer having a portable software. The internal storage unit is inaccessible to the computer. The portable software is copied or downloaded to the computer from an external source and executed by the computer. The wireless communication module is wirelessly connected with a receiving device. When the button is activated, a signal is transmitted to the CPU and a command is transmitted to the portable software by the CPU to execute screen mirroring control, so that images are transmitted from the computer to the receiving device through the USB connector and the wireless communication module. The safety and application diversity are effectively enhanced, and the one-button screen mirroring is realized.

15 Claims, 7 Drawing Sheets

(56) References Cited

U.S. PATENT DOCUMENTS

| | | | |
|---|---|---|---|
| 2008/0088634 A1* | 4/2008 | Thompson | G06F 3/14 |
| | | | 345/520 |
| 2009/0217335 A1 | 8/2009 | Wong et al. | |
| 2009/0265660 A1* | 10/2009 | Nobori | G06F 3/0483 |
| | | | 715/788 |
| 2010/0064063 A1 | 3/2010 | Deforche et al. | |
| 2010/0153643 A1* | 6/2010 | Kobayashi | H04N 1/00204 |
| | | | 711/115 |
| 2010/0295994 A1 | 11/2010 | Kaplan et al. | |
| 2010/0297964 A1 | 11/2010 | Austin et al. | |
| 2010/0299712 A1 | 11/2010 | Austin et al. | |
| 2010/0309896 A1 | 12/2010 | Sugiyama et al. | |
| 2014/0078265 A1* | 3/2014 | Ohba | H04N 5/2628 |
| | | | 348/47 |
| 2014/0082227 A1 | 3/2014 | Beel et al. | |
| 2019/0018443 A1* | 1/2019 | Ogiwara | G06F 1/08 |

FOREIGN PATENT DOCUMENTS

| | | |
|---|---|---|
| EP | 2756668 A1 | 7/2014 |
| EP | 2756668 B1 | 1/2017 |
| JP | 2008090561 A | 4/2008 |
| TW | 200516394 A | 5/2005 |
| TW | I269583 B | 12/2006 |
| TW | 201206128 A | 2/2012 |
| TW | 201342914 A | 10/2013 |
| TW | M501591 | 5/2015 |
| WO | 2013037981 A1 | 3/2013 |

\* cited by examiner

IMAGE TRANSMISSION DEVICE, IMAGE TRANSMISSION METHOD, AND IMAGE TRANSMISSION SYSTEM

CROSS-REFERENCE TO RELATED APPLICATION

This application claims the benefit of U.S. Provisional Application Ser. No. 62/694,208 filed on Jul. 5, 2018, and claims the priority to China Patent Application No. 201811241556.4 filed on Oct. 24, 2018, the entire contents of which are incorporated herein by reference for all purposes.

FIELD OF THE INVENTION

The present invention relates to an image transmission device, and more particularly to an image transmission device, an image transmission method, and an image transmission system.

BACKGROUND OF THE INVENTION

In recent years, a lot types of external devices are widely used to assist display and projection. For example, when a computer is used for presentation, the screen must be mirrored to the projector, so that content displayed on the computer screen is instantly projected onto the projection screen. Conventionally, a D-sub, a DVI or an HDMI wire is used to connect the computer and the projector for implementing the projection. However, the method herein is limited to the wired connection.

To avoid the limitation, the image transmission device is developed to implement the wireless connection between the computer and the screen/projector. In general, an image transmission device of this type usually comprises an image storage unit for storing relevant software programs and/or drivers; when the image transmission device is connected to a computer of a user, the computer will recognize the image transmission device as a universal serial bus (USB) mass storage device for providing the user to duplicate, install or execute the software on this image transmission device.

However, there are at least two drawbacks. Firstly, based on the reasons of data safety, more and more organizations (such as general companies, banks, government agencies, etc.) disable the functionality of the USB mass storage device in the staff computers. Under this circumstance, the image transmission devices described above become useless. Secondly, since the drivers or software on the image transmission device have to be installed and updated, the USB disk of the image transmission device must be writable. Because the software viruses or malwares are possible to be written to the image transmission device, the safety risks are occurred.

Therefore, there is a need of providing an improved image transmission device, an image transmission method, and an image transmission system, which are distinct from the prior art in order to solve the above drawbacks.

SUMMARY OF THE INVENTION

Some embodiments of the present invention are to provide an image transmission device, an image transmission method, and an image transmission system in order to overcome at least one of the above-mentioned drawbacks encountered by the prior art.

The present invention provides an image transmission device, an image transmission method, and an image transmission system. By utilizing an internal storage unit which cannot be accessed by a computer or other electronic devices, the safety and application diversity are effectively enhanced.

The present invention also provides an image transmission device, an image transmission method, and an image transmission system. Since the portable software is copied or downloaded to the computer from an external source and unnecessary to be pre-stored in the image transmission device, the updating of the portable software can be flexibly carried out and virus prevention effect for the image transmission device is improved. Furthermore, cooperating with the button of the image transmission device, the function of one-button screen mirroring is realized.

The present invention also provides an image transmission device, an image transmission method, and an image transmission system. The image transmission device is a USB device compatible with a human interface device (HID). None of any USB mass storage device is necessary in the image transmission device, and none of any software virus or malware is existed in the image transmission device. In the companies who disable the functionality of the USB mass storage device in the staff computers, the employees may successfully use the image transmission device of the present invention.

In accordance with an aspect of the present invention, there is provided an image transmission device. The image transmission device includes a central processing unit, a wireless communication module, a button, a universal serial bus connector and an internal storage unit. The wireless communication module is connected with the central processing unit. The button is connected with the central processing unit. The universal serial bus connector is connected with the central processing unit. The internal storage unit is connected with the central processing unit. The universal serial bus connector is inserted into a computer having a portable software. The internal storage unit is inaccessible to the computer. The portable software is copied or downloaded to the computer from an external source and executed by the computer. The wireless communication module is wirelessly connected with a receiving device. When the button is activated, a signal is transmitted to the central processing unit, and a command is sent out to the portable software by the central processing unit to execute screen mirroring control, so that images are transmitted from the computer to the receiving device through the universal serial bus connector and the wireless communication module.

In accordance with another aspect of the present invention, there is provided an image transmission method. The image transmission method includes steps of pairing an image transmission device with a receiving device for obtaining a connection information from the receiving device, copying or downloading a portable software to a computer, executing the portable software on the computer, inserting the image transmission device into the computer, activating a button of the image transmission device to make a command be sent out from the image transmission device to the portable software, and the portable software executing the command for controlling a screen mirroring, so that images are transmitted from the computer to the image transmission device, and then transmitted from the image transmission device to the receiving device, wherein an internal storage unit of the image transmission device is inaccessible to the computer.

In accordance with another aspect of the present invention, there is provided an image transmission system. The image transmission system includes a computer, a receiving device and an image transmission device. A portable software is copied or downloaded to the computer from an external source and executed by the computer. The image transmission device includes a central processing unit, a wireless communication module connected with the central processing unit and wirelessly connected with the receiving device, a button connected with the central processing unit, a universal serial bus connector connected with the central processing unit and inserted into the computer, and an internal storage unit connected with the central processing unit. The internal storage unit is inaccessible to the computer. When the button is activated, a signal is transmitted to the central processing unit, and a command is sent out to the portable software by the central processing unit to execute screen mirroring control, so that images are transmitted from the computer to the receiving device through the universal serial bus connector and the wireless communication module.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
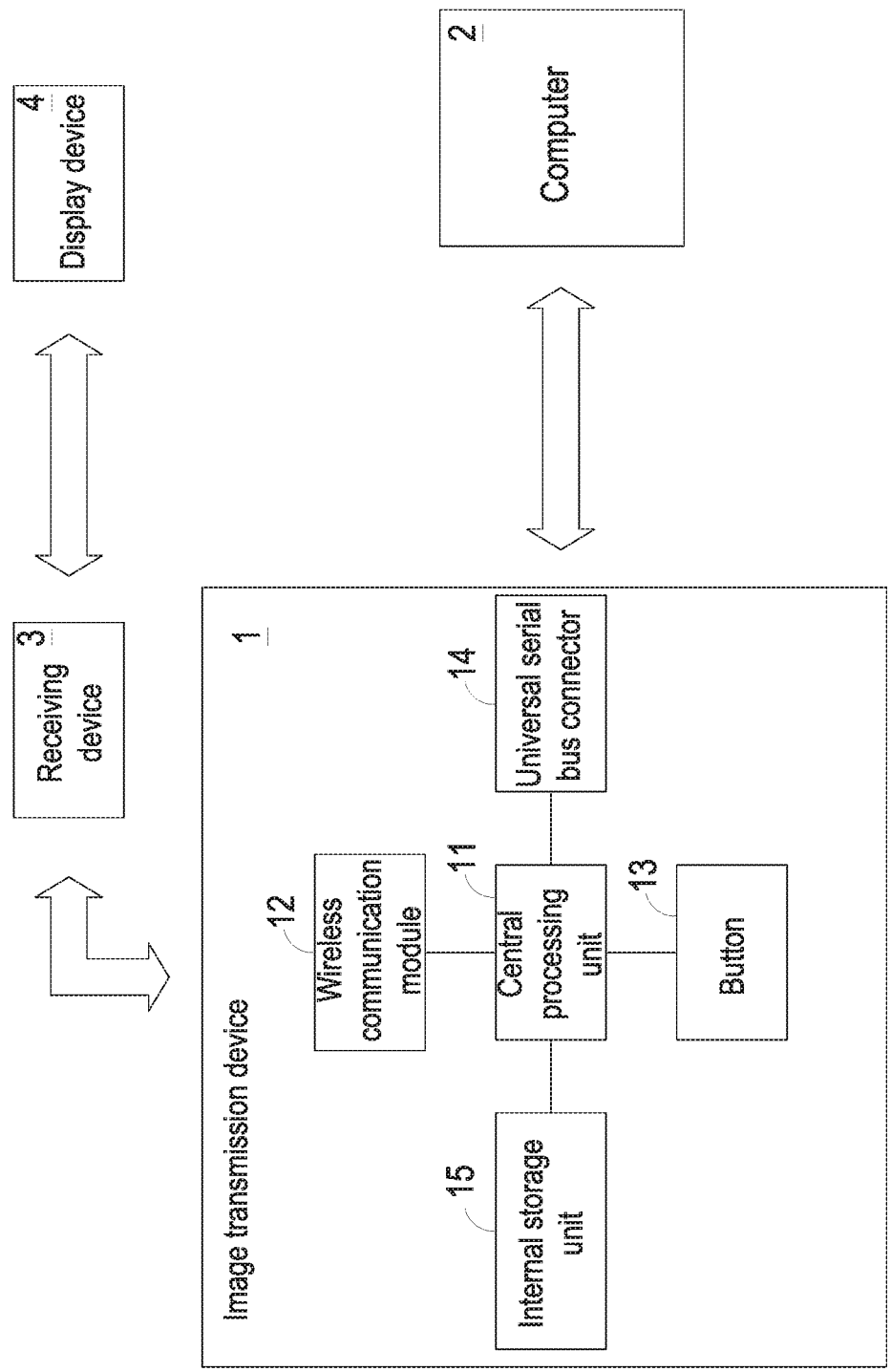
FIG. 1 schematically illustrates the configuration of an image transmission device according to an embodiment of the present invention.
Figure 2:
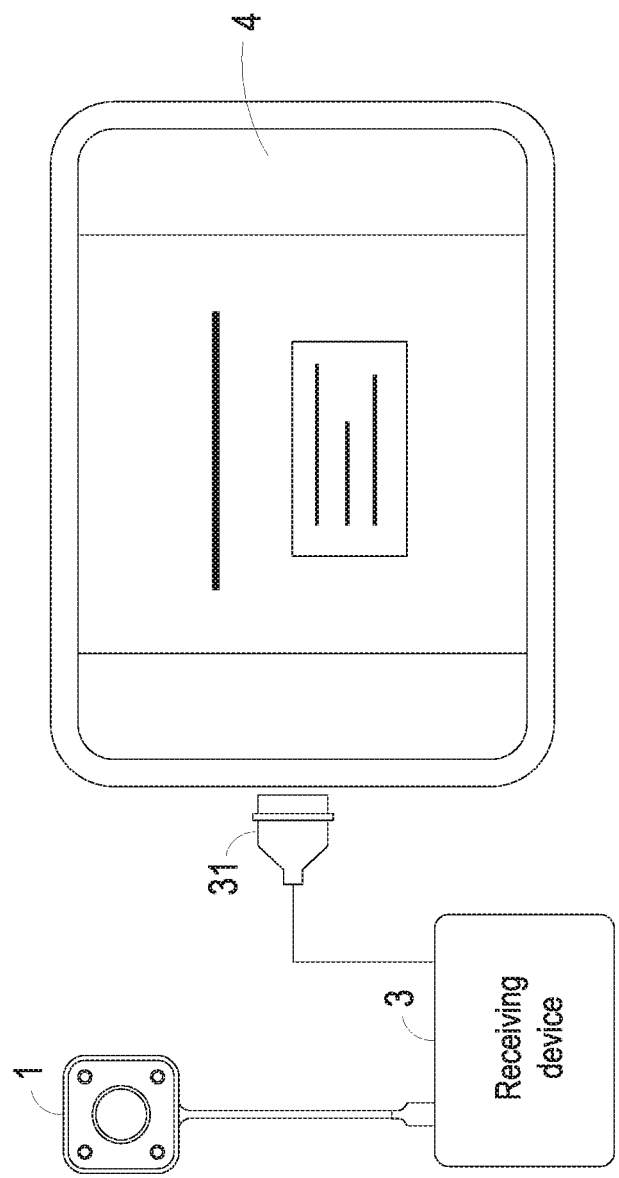
FIG. 2 schematically illustrates the pairing of an image transmission device and a receiving device through USB insertion.
Figure 3:
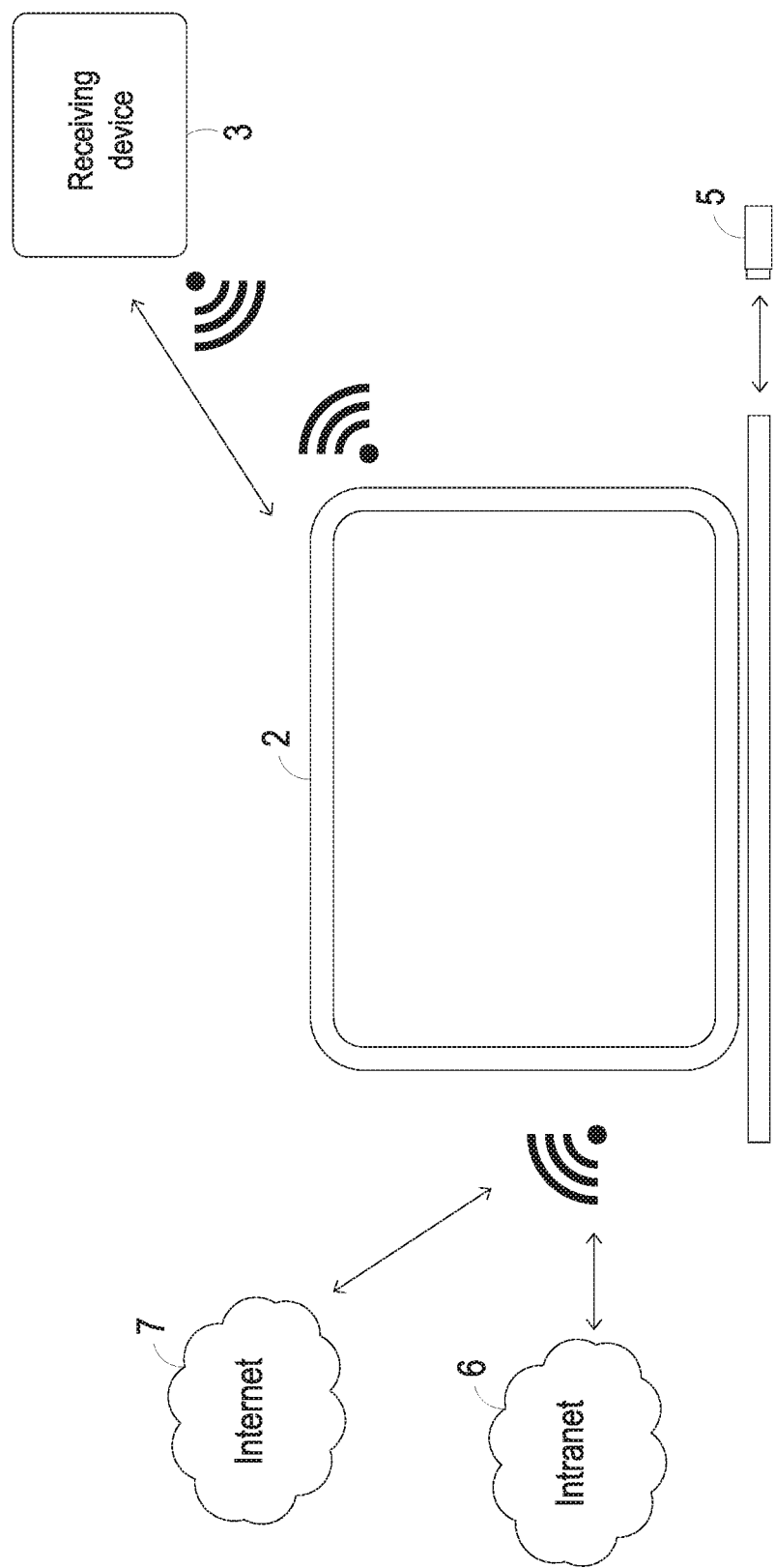
FIG. 3 schematically illustrates connections between a computer and a receiving device, a USB flash drive, an intranet and an internet.
Figure 4:
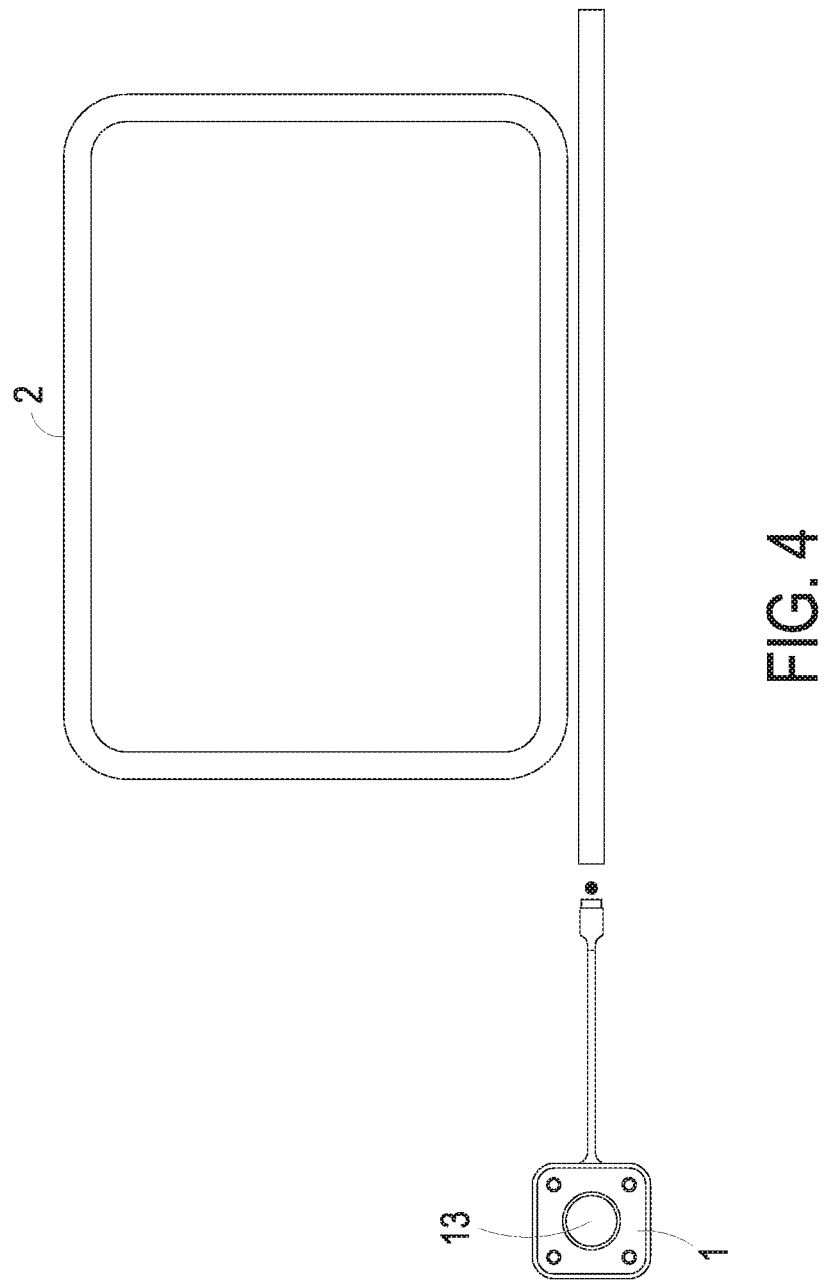
FIG. 4 schematically illustrates the insertion of an image transmission device into a computer.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As shown in FIGS. 1-5B, an image transmission device 1 according to an embodiment of the present invention includes a central processing unit 11, a wireless communication module 12, a button 13, a universal serial bus (USB) connector 14 and an internal storage unit 15. The wireless communication module 12 is connected with the central processing unit 11, and the wireless communication module 12 includes, but not limited to, a Wi-Fi communication unit.

The button 13 is connected with the central processing unit 11, and the button 13 may be a physical button or a software button, in which the software button may be a virtual button or a touch control button implemented through manners of touch control or biometric identification, but not limited herein. The virtual button may be directly displayed on a screen of a computer. Further, for example, a virtual button may be displayed on a touch control screen and be able to be clicked by a mouse and/or touched by a finger, but not limited herein. The universal serial bus connector 14 is connected with the central processing unit 11. The universal serial bus connector 14 may be a micro-USB connector, a mini-USB connector, or a type-C USB connector. The internal storage unit 15 is connected with the central processing unit 11.

The universal serial bus connector 14 is inserted into a computer 2 having a portable software. The internal storage unit 15 is inaccessible to the computer 2. In other words, the internal storage unit 15 will not be recognized or identified as a disk by the computer 2, so that no recognized disk or identified disk will be seen by a user on the operation system. However, the image transmission device 1 will be recognized as an HID device, and even a USB-HID device, which is like a mouse or a keyboard. The driver of the image transmission device 1 will be automatically set by the operation system on the computer 2. By utilizing the internal storage unit 15 which cannot be accessed by the computer 2 or other electronic devices, the safety and application diversity of the image transmission device 1 are effectively enhanced.

In some embodiments, the ways of making the internal storage unit 15 inaccessible to the computer 2 can be realized by the following examples. The first one is to utilize an internal storage unit 15 which is not compatible with the specification or protocol of USB mass storage device. The second one is to provide an internal storage unit 15 having a disk format that cannot be read by the operation system of the computer 2. For example, an internal storage unit 15 having ext4 or HFS format is provided to Windows® operation system, or an internal storage unit 15 having NTFS format is provided to Macintosh® operation system. Either a hardware isolation utilized to make the internal storage unit 15 not to substantially connect with the computer 2 or a software manner to hide the internal storage unit 15 on the operation system could be an alternative method.

The portable software is copied or downloaded to the computer 2 from an external source and executed by the computer 2. In some embodiments, the portable software can be simply copied or downloaded to the computer 2 and executed by the computer 2 without the authority of a system administrator. In the companies who disable the software installation in the computer 2 of an employee, the employee still can directly use this portable software to cooperate with the image transmission device 1 for realizing the image transmission. Since the portable software is copied or downloaded to the computer 2 from an external source and unnecessary to be pre-stored in the image transmission device 1, the updating of the portable software can be flexibly carried out and virus prevention effect for the image transmission device 1 is improved.

The wireless communication module 12 is wirelessly connected with the receiving device 3. In some embodiments, the receiving device 3 can be a projector at least including a corresponding wireless module to communicate with the wireless communication module 12, but not limited thereto. When the button 13 is activated, a signal is transmitted to the central processing unit 11, and a command sent out by the central processing unit 11 is transmitted to the portable software to execute screen mirroring control, so that images are transmitted from the computer 2 to the image transmission device 1 through the universal serial bus connector 14, and then transmitted to the receiving device 3 through the wireless communication module 12. In some embodiments, the receiving device 3 is connected with the display device 4, and the plural images are synchronously displayed on a screen of the computer 2 and the display device 4, thereby realizing the synchronous screen mirroring between the computer 2 and the display device 4. The function of one-button screen mirroring can be done by the image transmission device 1 of the present invention.

Please refer to FIG. 1 and FIG. 2 again. In some embodiments, a connection information of the receiving device 3 is stored in the internal storage unit 15, and the connection information includes SSID and password of the Wi-Fi network, but not limited herein. Before inserting the image transmission device 1 into the computer 2 for performing the screen mirroring, the universal serial bus connector 14 of the image transmission device 1 is firstly inserted into the receiving device 3 for pairing the central processing unit 11 and the receiving device 3. When the pairing between the central processing unit 11 and the receiving device 3 is complete, the connection information is written into the internal storage unit 15 by the central processing unit 11. In addition, the receiving device 3 may connect to the display device 4 through a connector 31 and display the connection information on the display device 4. The connection information includes SSID and password of the Wi-Fi network, but not limited herein.

Please refer to FIG. 1 and FIG. 3 again. In some embodiments, the external source may be the receiving device 3, a universal serial bus flash drive 5, an intranet 6, or an internet 7. The intranet 6 includes a closed local area network and a network attached storage (NAS) installed on the closed local area network. If the NAS is installed or built on the internet 7, the NAS would be classified as a public cloud. The internet 7 includes a public cloud, a private cloud, a community cloud and a hybrid cloud. The universal serial bus flash drive 5 is preferred to be a read-only universal serial bus flash drive provided by an in-house IT management personnel of the enterprise, but not limited thereto. The portable software can be simply downloaded through a URL or can be simply copied and pasted to be duplicated to the computer 2. In the present invention, none of any installation and authority of the administrator is necessary to implement the duplication and execution of the portable software. Moreover, the portable software can communicate with the computer 2 through the USB-HID protocol. The command, the status, and the screen mirroring data can be communicated through the communicational protocol.

In addition, the portable software can be operated in the background of the computer 2. When the image transmission device 1 is inserted into the computer 2, the portable software starts to communicate with the image transmission device 1 through the USB-HID communicational protocol. The so-called communication herein includes transmitting a command to the central processing unit 11 of the image transmission device 1 to enable the wireless connection between the wireless communication module 12 and the receiving device 3.

Figure 5A:
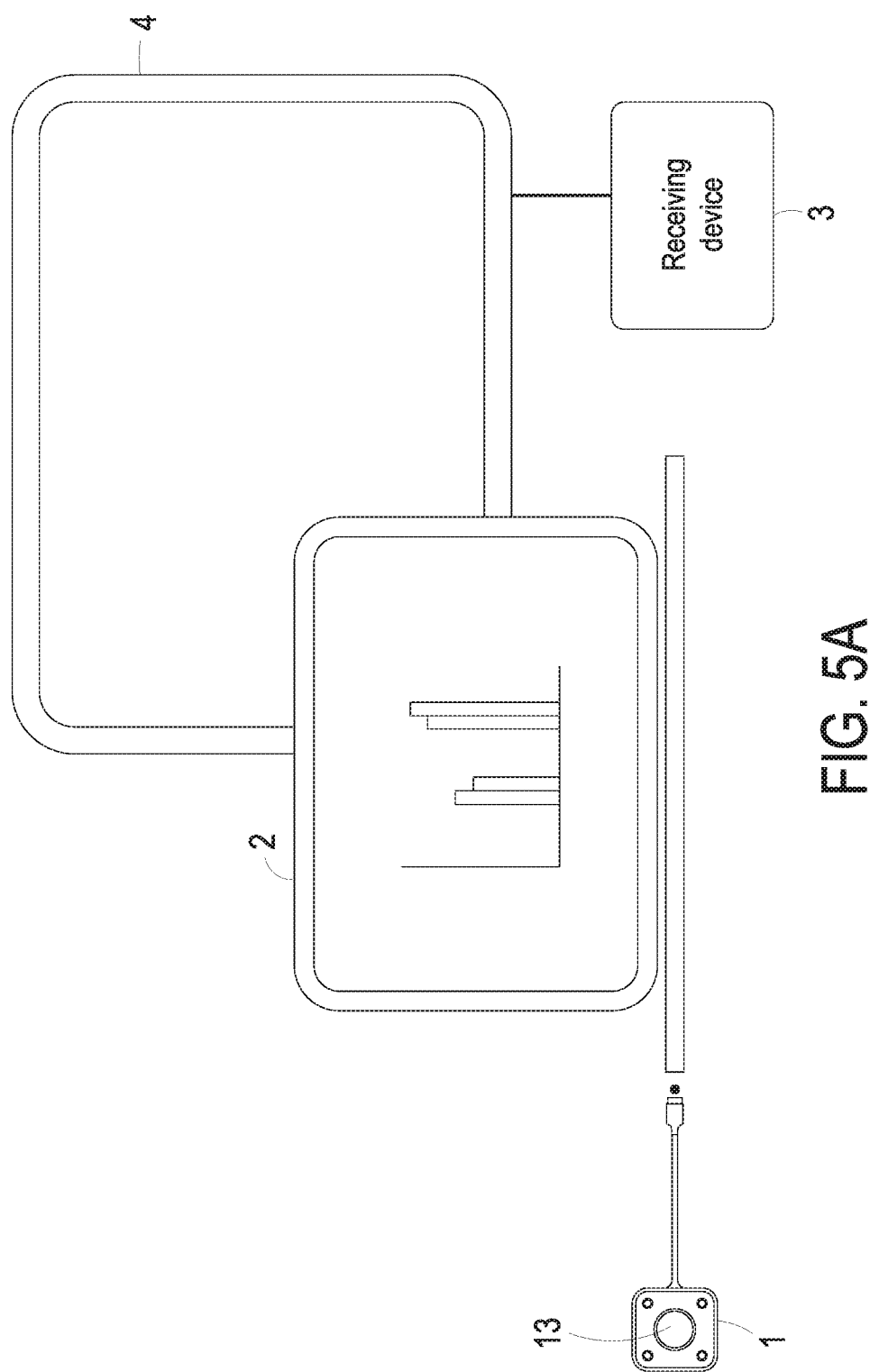
FIG. 5A schematically illustrates an image transmission device, a computer and a receiving device, and a display device connected with the receiving device.
Figure 5B:
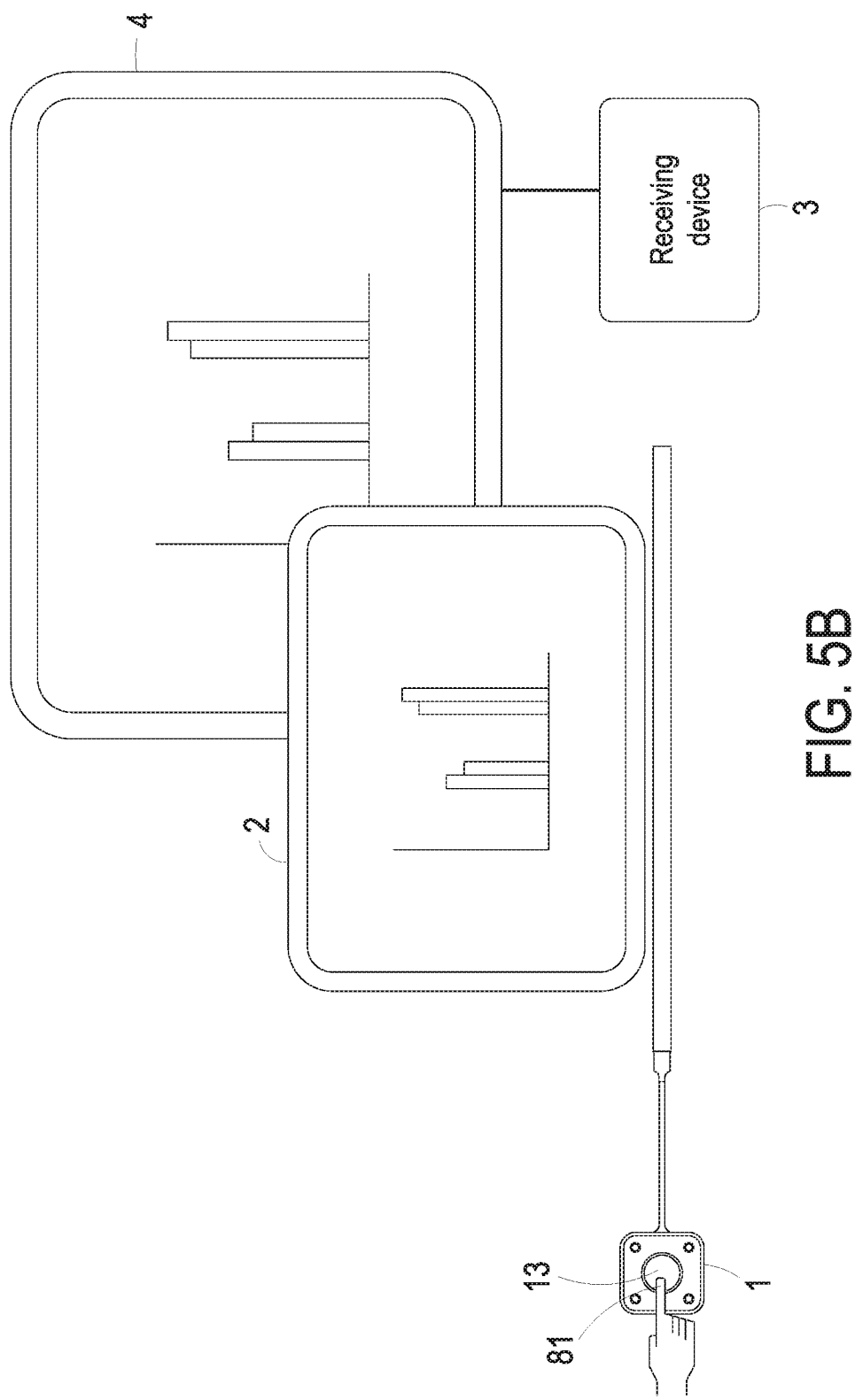
FIG. 5B schematically illustrates the screen mirroring from the screen of the computer to the display device after the button shown in FIG. 5A is activated.

Please refer to FIG. 1, FIG. 5A and FIG. 5B again. When the wireless connection between the wireless communication module 12 and the receiving device 3 is successfully established, the user may, as shown in FIG. 5B, use his or her finger 81 to press the button 13 of the image transmission device 1 to instruct the central processing unit 11 to control the screen mirroring, and then the images displayed on the computer are transmitted to the receiving device 3 through the wireless communication module 12. The receiving device 3 may itself include the display device 4, or connect to the display device 4 through a connector 31. The images displayed on the computer 2 are synchronously displayed on the display device 4, but not limited thereto.

Figure 6:
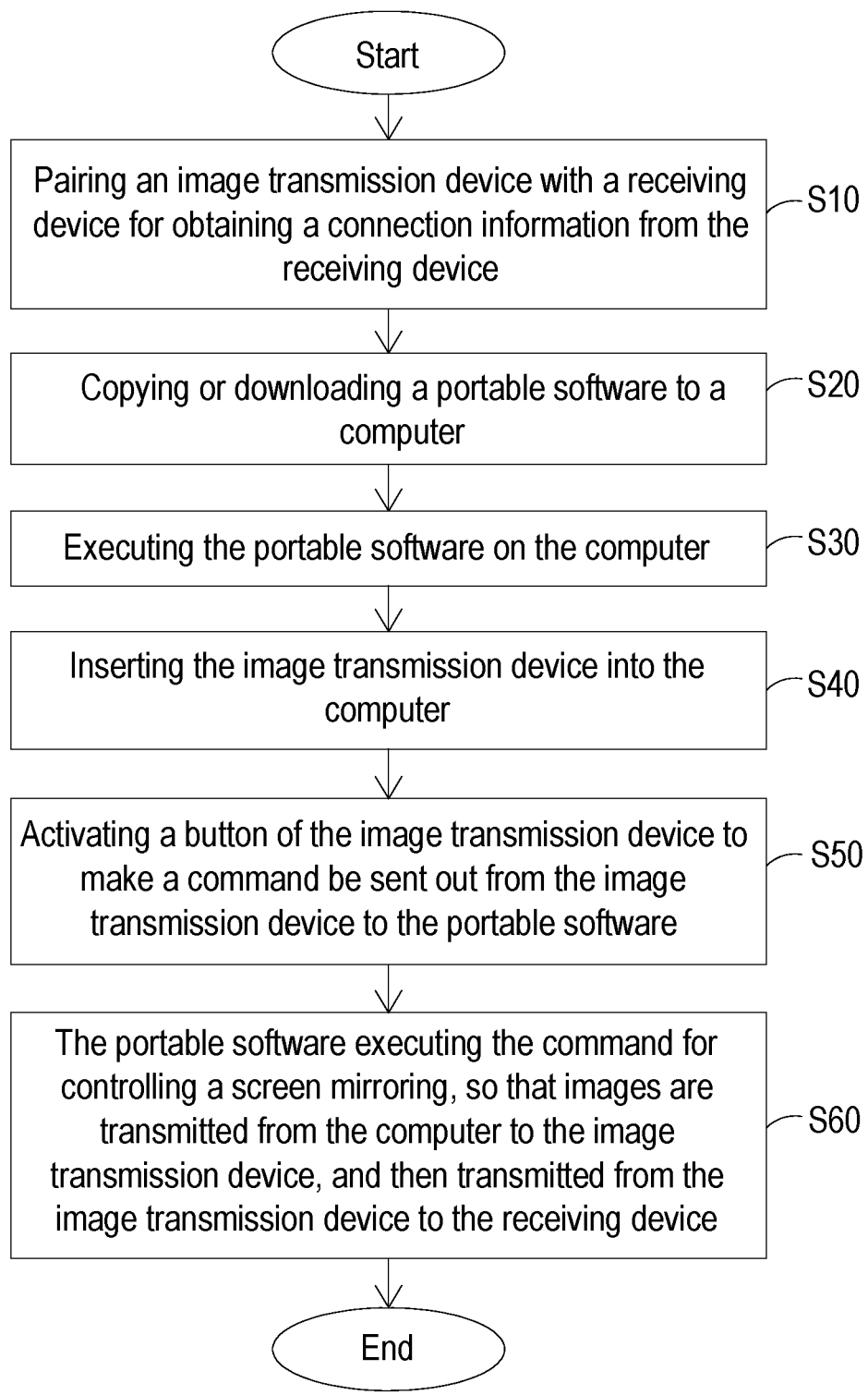
FIG. 6 schematically illustrates the flow chart of an image transmission method according to an embodiment of the present invention.

Please refer to FIG. 1 and FIG. 6. FIG. 6 schematically illustrates the flow chart of an image transmission method according to an embodiment of the present invention. As shown in FIG. 1 and FIG. 6, an image transmission method according to an embodiment of the present invention includes steps as follows. Firstly, as shown in step S10, an image transmission device 1 is paired with a receiving device 3 for obtaining a connection information from the receiving device 3. Next, as shown in step S20, a portable software is copied or downloaded to a computer 2. Then, as shown in step S30, the portable software is executed on the computer 2. Next, as shown in step S40, the image transmission device 1 is inserted into the computer 2. Next, as shown in step S50, a button 13 of the image transmission device 1 is activated to make a command be sent out from the image transmission device 1 to the portable software. Then, as shown in step S60, the portable software executes the command for controlling a screen mirroring, so that images are transmitted from the computer 2 to the image transmission device 1, and then transmitted from the image transmission device 1 to the receiving device 3. In particular, the image transmission device 1 further includes a central processing unit 11, a wireless communication module 12, a USB connector 14 and an internal storage unit 15. The wireless communication module 12, the button 13, the USB connector 14 and the internal storage unit 15 are connected with the central processing unit 11. The internal storage unit 15 of the image transmission device 1 is inaccessible to the computer 2. That is, the computer 2 cannot access the internal storage unit 15.

In some embodiments, the central processing unit 11 controls the screen mirroring, so that the images displayed on the computer 2 are transmitted to the receiving device 3 through the wireless communication module 12. The receiving device 3 includes a display device 4, and the images displayed on the computer 2 are synchronously displayed on the display device 4.

Additionally, in the step S10, during the progress of pairing the image transmission device 1 and the receiving device 3, it is preferred to insert the USB connector 14 of the image transmission device 1 into the receiving device 3 for exchanging data, and the connection information of the receiving device 3 is written into the internal storage unit 15 by the central processing unit 11.

From the above description, the present invention provides an image transmission device, an image transmission method, and an image transmission system. By utilizing an internal storage unit which cannot be accessed by a computer or other electronic devices, the safety and application diversity are effectively enhanced. Meanwhile, since the portable software is copied or downloaded to the computer from an external source and unnecessary to be pre-stored in the image transmission device, the updating of the portable software can be flexibly carried out and virus prevention effect for the image transmission device is improved. Furthermore, cooperating with the button of the image transmission device, the function of one-button screen mirroring is realized. The image transmission device is a USB device compatible with a human interface device (HID). None of any USB mass storage device is necessary in the image transmission device, and none of any software virus or malware is existed in the image transmission device. In the companies who disable the functionality of the USB mass storage device in the staff computers, the employees may successfully use the image transmission device of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image transmission device, comprising:
a central processing unit;
a wireless communication module connected with the central processing unit;
a button connected with the central processing unit;
a universal serial bus connector connected with the central processing unit; and
an internal storage unit connected with the central processing unit,
wherein the universal serial bus connector is inserted into a computer having a portable software, the internal storage unit is inaccessible to the computer, the portable software is copied or downloaded to the computer from an external source and executed by the computer, the wireless communication module is wirelessly connected with a receiving device, and when the button is activated, a signal is transmitted to the central processing unit, and a command is sent out to the portable software by the central processing unit to execute screen mirroring control, so that images are transmitted from the computer to the receiving device through the universal serial bus connector and the wireless communication module.

2. The image transmission device according to claim 1, wherein a connection information of the receiving device is stored in the internal storage unit.

3. The image transmission device according to claim 1, wherein the button is a physical button or a software button, and the software button is a virtual button displayed on a screen.

4. The image transmission device according to claim 1, wherein the external source comprises the receiving device, a universal serial bus flash drive, an intranet, or an internet.

5. The image transmission device according to claim 4, wherein the intranet comprises a closed local area network and a network attached storage installed on the closed local area network.

6. The image transmission device according to claim 4, wherein the universal serial bus flash drive is a read-only universal serial bus flash drive.

7. The image transmission device according to claim 4, wherein the internet comprises a public cloud, a private cloud, a community cloud and a hybrid cloud.

8. The image transmission device according to claim 1, wherein the receiving device is connected with a display device, and the images are synchronously displayed on a screen of the computer and the display device.

9. An image transmission method, comprising steps of:
(a) pairing an image transmission device with a receiving device for obtaining a connection information from the receiving device;
(b) copying or downloading a portable software to a computer;
(c) executing the portable software on the computer;
(d) inserting the image transmission device into the computer, wherein an internal storage unit of the image transmission device is inaccessible to the computer;
(e) activating a button of the image transmission device to make a command be sent out from the image transmission device to the portable software; and
(f) the portable software executing the command for controlling a screen mirroring, so that images are transmitted from the computer to the image transmission device, and then transmitted from the image transmission device to the receiving device.

10. The image transmission method according to claim 9, wherein the image transmission device further comprises:
a central processing unit connected with the button and the internal storage unit;
a wireless communication module connected with the central processing unit; and
a universal serial bus connector connected with the central processing unit.

11. The image transmission method according to claim 10, wherein the universal serial bus connector is inserted into the computer, the command is transmitted by the central processing unit, and the images displayed on the computer are transmitted to the receiving device through the wireless communication module.

12. The image transmission method according to claim 9, wherein the receiving device comprises a display device, and the images displayed on the computer are synchronously displayed on the display device.

13. The image transmission method according to claim 10, wherein in the step (a), the connection information of the receiving device is written into the internal storage unit by the central processing unit.

14. The image transmission method according to claim 9, wherein the portable software is copied or downloaded to the computer from an external source.

15. An image transmission system, comprising:
a computer, wherein a portable software is copied or downloaded to the computer from an external source and executed by the computer;
a receiving device; and
an image transmission device, comprising:
a central processing unit;
a wireless communication module connected with the central processing unit and wirelessly connected with the receiving device;
a button connected with the central processing unit;
a universal serial bus connector connected with the central processing unit and inserted into the computer; and
an internal storage unit connected with the central processing unit,
wherein the internal storage unit is inaccessible to the computer, and when the button is activated, a signal is transmitted to the central processing unit, and a command is sent out to the portable software by the central processing unit to execute screen mirroring control, so that images are transmitted from the computer to the receiving device through the universal serial bus connector and the wireless communication module.

\* \* \* \* \*

UNITED STATES PATENT AND TRADEMARK OFFICE
CERTIFICATE OF CORRECTION

PATENT NO. : 10,491,760 B1
APPLICATION NO. : 16/216537
DATED : November 26, 2019
INVENTOR(S) : Botao Lin et al.

Page 1 of 1

It is certified that error appears in the above-identified patent and that said Letters Patent is hereby corrected as shown below:

On the Title Page

Please correct the Applicant's country as follows:
--(71) Applicant: DELTA ELECTRONICS, INC., Taoyuan (TW)--

Signed and Sealed this
Nineteenth Day of May, 2020

Andrei Iancu
*Director of the United States Patent and Trademark Office*